United States Patent [19]

Deis

[11] Patent Number: 4,550,418

[45] Date of Patent: Oct. 29, 1985

[54] METHOD OF MAKING COORDINATE MEASUREMENTS

[75] Inventor: Jerome E. Deis, Kettering, Ohio

[73] Assignee: The Warner & Swasey Company, Cleveland, Ohio

[21] Appl. No.: 636,793

[22] Filed: Aug. 1, 1984

Related U.S. Application Data

[63] Continuation of Ser. No. 431,514, Sep. 30, 1982, abandoned, which is a continuation of Ser. No. 71,623, Aug. 31, 1979, abandoned.

[51] Int. Cl.[4] ...................... H03K 13/02; H03K 21/02
[52] U.S. Cl. ........................................ 377/17; 33/556; 33/503; 364/561; 377/44
[58] Field of Search .................. 340/340 P, 340 M; 377/17, 45, 44; 33/174 L; 364/561

[56] References Cited

U.S. PATENT DOCUMENTS

| | | | |
|---|---|---|---|
| 3,403,448 | 10/1968 | Aller | 33/174 L |
| 3,740,532 | 6/1973 | Esch | 377/45 |
| 4,118,871 | 10/1978 | Kirkham | 33/174 L |
| 4,153,998 | 5/1979 | McMurtry | 33/174 L |

*Primary Examiner*—T. J. Sloyan
*Attorney, Agent, or Firm*—Kenneth A. Seaman; John R. Benefiel; Raymond J. Eifler

[57] ABSTRACT

A method of making measurements on a machine having a movable probe for measuring a part in which a present location of the probe is maintained and a past location (e.g., a part measurement) of the probe is also maintained (stored) and advantageously displayed. The measuring apparatus includes two sets of storage members, with the present position information of the probe stored in one set. The present probe position information is transferred to the other storage members in response to a control signal. The control signal, such as an electrical signal indicating contact with an object, causes measurements to be transferred from the one set of storage members to the second set of storage members and, advantageously, the transfer of further information to the second storage members may be locked out of a predetermined time or until an event occurs (such as a resetting signal). The first set of storage members continue to maintain present position information on the probe which may be moving, while an output device (display, etc.) is coupled to the second set of storage members and is not affected by the change in the first set of storage members. The present invention has application of multi-dimension measuring (e.g., coordinate measuring machines) and single dimension measuring (e.g., height gages).

3 Claims, 1 Drawing Figure

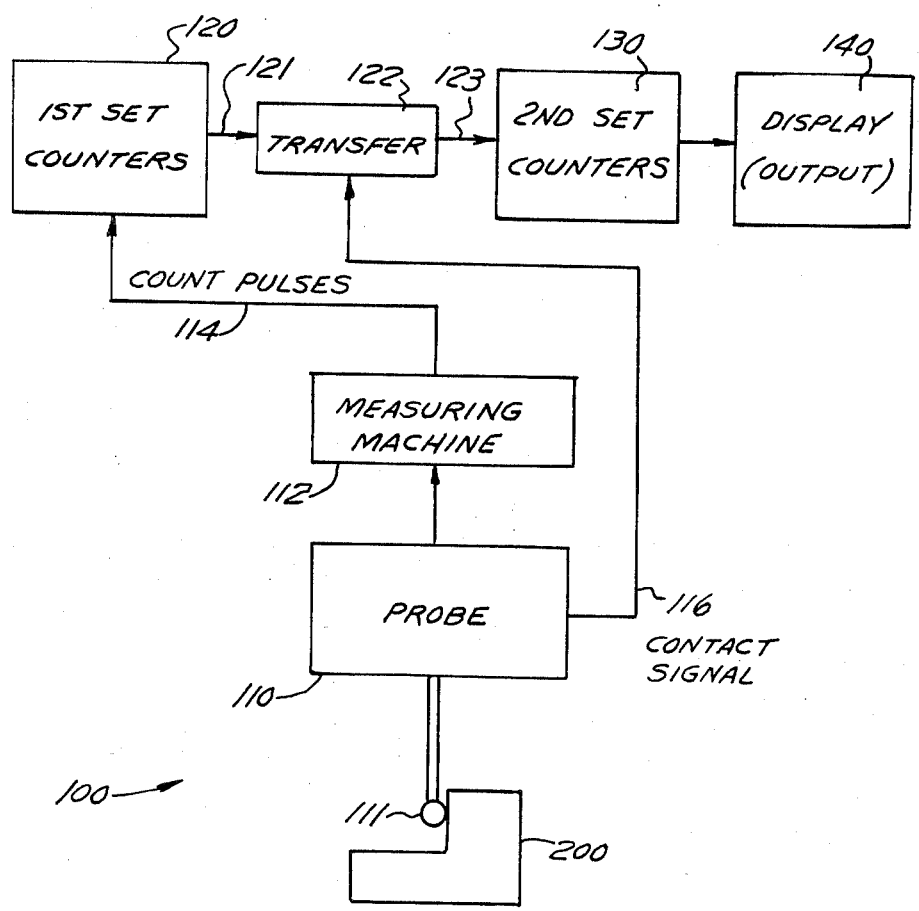

METHOD OF MAKING COORDINATE MEASUREMENTS

CROSS REFERENCE TO RELATED PATENTS

This is a continuation of co-pending application Ser. No. 431,514 filed on Sept. 30, 1982 abandoned which is itself a continuation of application Ser. No. 71,623 filed Aug. 31, 1979, abandoned.

The present invention is related to a patent application Ser. No. 71,622; filed 8/31/79 entitled "Measuring Apparatus" filed by G. L. Tumbush, the specification and drawings of which are hereby incorporated by reference.

BACKGROUND OF THE INVENTION

The present invention relates to coordinate measuring machines of the type having a movable probe for engaging an object. More particularly, the present invention has particular application to a coordinate measuring machine in which a probe movable in several independent directions is moved to inspect the object and may touch the object while the probe is still moving. The present invention also has application to height gages in which only a single direction is being measured.

In such machines, it is desirable to have an output readout system which identifies the precise location of contact between the probe (or a height gage's contact member) and the object. Such systems are well known in the prior art and in commercial use generally.

In such systems, it is also desirable, however, to also provide information on present location of the probe (or contact member) at all times. In the systems described in the preceeding paragraph, however, this information is not available, because the counter has stopped and only the position information regarding the present location of the probe is available.

Prior art systems could display the present location of the probe. However, in such systems, if the probe had been moving at the time of contact, the present location is not where the probe met the object. Consequently, with the systems of the prior art, one either had present probe location or a location of the contact point, but not both.

Future calculated locations of the probe are determined generally by the present location of the probe plus an increment of movement of the probe. Lack of present position information of the probe defeats such calculations and requires a rezeroing of the machine, that is, a movement of the probe to a predetermined reference point to again rezero the machine before proceeding with the measurement.

It is undesirable to rezero the machine after each measurement, but a system which retains and displays only the point of contact does require such information. Alternatively, the probe might be relocated to the point of contact, but, again, this is time consuming and troublesome, as well as a possible source of inaccuracies to perform the measurements.

Using a peripheral computer has been suggested to record the point of contact while the counter continues to record the present position. Such systems are expensive and require considerable programming to obtain accurate measurements.

Prior art systems for providing coordinate measurements are shown in U.S. Pat. Nos. 3,748,043; 3,740,532; 3,713,139; 3,691,353 and others.

Accordingly, the prior art systems of providing coordinate measurements have limitations and disadvantages which make them undesirable.

SUMMARY OF THE INVENTION

The present invention overcomes the limitations and disadvantages of the prior art by providing a system which maintains both present and past information on the probe position without requiring an expensive computer peripheral.

The present system is characterized by two sets of counters or storage members, for position measurement of a movable probe, one of said sets of counters being directly connected to receive count pulses (measurement indicators) indicative of present probe position and the other set of counters being coupled to a display. Information in the first set of counters is transferred to the second set in response to a signal indicative of contact between the probe and an object. This signal may also provide a lock out of further transfers between the two sets of counters, either for a predetermined time or until the system is reactivated by a resetting signal. In a single axis measurement system, only one storage member is required in each set, while in a multi-axis measurement system, there is a storage member in each set for each axis.

In this way, the one set of counters provides an output indicative of the position in which contact is made between a probe and an object (for an output) and the other counter maintains information on the present location of the probe (for further measurements). The present location of the probe may be maintained as a modifier (an offset, or relative position, dependent on the past probe location in the other set of counters.) As a modifier, the two sets of counters would have to be appropriately combined to obtain present position information.

The present invention has the advantage that present probe position information may be maintained while providing measurement information of a past probe position.

The present invention also has the advantage that it does not require expensive external peripheral devices such as computers or calculators, but rather may use an internal micro-processor which is more economical.

The present invention has the further advantage of avoiding a rezeroing of the machine after each measurement.

The measurements obtained by use of the present invention are not affected by probe movement subsequent to contacting a measurement point.

The display or output of measurements made using the present invention also are free of undesirable digit fluctuation caused by minute probe movements.

Accordingly, the measuring system of the present invention overcomes the limitations and undesirable features of the prior art while providing a measurement system which is easy to use and relatively inexpensive. The system of the present invention also provides a relatively inexpensive method of making coordinate measurements for inspection of a work piece.

Other objects and advantages will be apparent to one skilled in the art in view of the following detailed description of the drawings and the appended claims.

BRIEF DESCRIPTION OF THE DRAWINGS

The FIGURE is a block diagram of the apparatus used in the present invention.

DETAILED DESCRIPTION OF THE DRAWINGS

The FIGURE illustrates, in block diagram form, a measuring apparatus 100 of the present invention for measuring a part 200.

The apparatus 100 includes a probe 110 movably mounted to a measuring machine, shown as block 112. The apparatus 100 also includes a first set of counters 120, a second set of counters 130 and a display 140. Each of counters (120,130) preferably includes at least three separate counters for measuring simultaneously in three directions.

The probe 110 is preferably a contact-sensing probe of the type described in U.S. Pat. No. 4,153,998 to McMurtry entitled "Improvements in Probes". This probe provides an electrical contact signal indicative of contact between its stylus tip 111 and an object. The probe 110 is mounted to the measuring machine 112 which is advantageously of the type generally described in U.S. Pat. No. 3,403,448 to W. F. Aller for a "Measuring Machine". Alternatively, the present invention is applicable to a height gage having a displacable member movable only in a vertical direction.

The measuring machine 112 preferably has three orthogonal degrees of freedom for probe movement and simultaneously provides count pulses indicative of displacement of the probe in each of the three degrees (or axes) of freedom. The count pulses are provided on lines indicated generally by a referenced numeral 114 to the first set of counters 120 or storage members. The first set of counters 120 are coupled by a transfer circuit 122 to the second set of counters 130 or storage members. The transfer logic 122 is responsive to a contact signal on a line 116 indicative of a displacement of the probe stylus tip 111. Additionally, though not shown, the transfer circuit 122 may lock out or prevent a second transfer between the counters for a predetermined time. Or, the circuit 122 may prevent a second transfer until the circuit or probe tip has been reset or reactivated.

The transfer circuit 122 is responsive to the contact signal on the line 116 to provide a transfer of the counts (i.e., position information) from the first set of counters 120 to the second set of counters 130. Lines 121, 123 couple the transfer circuit 122 to the first set of counters 120 and the second set of counters 130, respectively.

The second set of counters 130 are coupled to the display 140 to provide an output of the position information contained in the second set of counters 130.

The probe 110 is mounted to the measuring machine 112 to displace in response to operator movement or computer control (not shown) to inspect the part 200. When the probe 110 and its tip 111 are moved into contact with the part 200, the probe tip 111 displaces with respect to the probe 110 and generates a contact signal on line 116. In response to the contact signal on line 116, the second set of counters 130 is updated to reflect the current position information from the first set of counters 120. In this way, the second set of counters 130 and the display 140 have position information indicative of the location of the displacement of the probe tip 111. This displacement of the probe tip 111 is indicative of the location of a feature of the part in contact with the probe tip 111.

The probe 110 and the tip 111 generally continue to move even after contact with the part 200 and the measuring machine 112 continues to provide count pulses on the line 114. These count pulses on the line 114 are used to update the first set of counters 120 and thereby the first set of counters 120 always contain measurement information on the present location of the probe tip.

The information stored in the first set of counters 120 may not be an entire set of position information, but may merely be a modifier of the position information contained in the second set of counters 130. In the event that only the modifier of the position (differential) is stored in the first set of counters 120, that differential is used to modify (add to or subtract from) the position in the second set of counters 130. However, it is important that both the location of the contact point between the probe and the object and the current location of the probe be maintained separately and not be confused by the system.

The sets of counters 120, 130 may be hardware counters or may be memory storage as in a computer or associated with a micro-processor. The term "counters" has been used throughout this application to refer generically to such measurement information receiving and storing members. In the preferred embodiment the first set of counters 120 is of the hardware type to allow an accurate response to rapidly occuring count pulses, while the second set of counters 130 are maintained in software to allow accumulation of a large binary number at low cost. In such a system, the first set of counters contains only relative displacement information (a modifier to the second set of counters) and the transfer circuit 122 periodically (perhaps every millisecond or two) transfers the information from said first set of counters 120 into said second set of counters 130 without regard to said contact signal on line 116. However, by appropriate selection of the size of the counters (binary capacity) and the length and resolution of measurement, such as periodic transfer, need not be done.

It will be appreciated that the foregoing description of the invention is of one embodiment only and that many modifications of this invention are possible without departing from the spirit of the present invention. For instance, other types of probe location could be used from that which is disclosed. The contact signal used need not be generated from the probe itself but could be provided from an external source, perhaps an operator controlled input indicative of a particular feature or condition. The counts between said first and second counters could be transferred periodically as well as in response to the contact signal. Of course, the application of this invention to single axis height gages as well as multi-axis machines has been discussed. Accordingly, the foregoing description should be considered as merely illustrative of the principles of the present invention and not a limitation thereon. The invention in the present application is defined solely by the following claims.

Having thus described the invention what is claimed is:

1. A method of measuring an object with a machine having a probe, said method comprising the steps of
    moving the probe and object relative to each other,
        said step of moving the probe and object relative to each other including the step of moving the probe and object into engagement and continuing the relative movement between the probe and object for at least a short time after their engagement, generating signals during all of the relative movement between the probe and object with each signal being indicative of an increment of relative movement between the probe and object, transmitting all of the signals generated during relative movement between the probe and object to a first data storage unit, storing in the first data storage unit data corresponding to each of the signals generated during relative movement between the probe and object, transmitting from the first data storage unit to a second data storage unit data indicative of the position of engagement of the probe and object, displaying the data indicative of the position of engagement of the probe and object, and maintaining the displayed data constant during the continued relative movement between the probe and object after their engagement so that the displayed data is indicative of the relative position of the probe and object at the time of engagement even though the relative movement between the probe and object continues for at least a short time after their engagement.

2. An apparatus for use in measuring an object, said apparatus comprising a probe (110), means (112) for providing relative movement between said probe (110) and object (200), signal generator means (112) for generating a series of signals during relative movement between said probe and object with each signal being indicative of a increment of relative movement between said probe and object, first data storage means (120) connected with said signal generator means for storing data corresponding to each of the signals generated during relative movement between said probe and object, second data storage means (130) for storing only data received from said first data storage means, means (122) for periodically transmitting from said first data storage means to said second data storage means data indicative of the amount of relative movement between said probe and the object during each period, means (122) for interrupting the periodic transmission of data from said first data storage means to said second data storage means and for effecting the transmittal of any data stored in said first data storage means to said second data storage means in response to engagement of said probe and object, and display means (140) for displaying data indicative of the relative position of said probe and object at the time of engagement.

3. An apparatus as set forth in claim 2 wherein said means for providing relative movement between said probe and object is operable to continue the relative movement between said probe and object for at least a short time after engagement of said probe and object, said signal generator means being operable to generate signals during the continued relative movement between said probe and object, said first data storage means being operable to store data corresponding to the signals generated during the continued relative movement between said probe and object while the data displayed by said data display means remains constant.

* * * * *